(12) United States Patent
Morissette et al.

(10) Patent No.: US 10,386,006 B2
(45) Date of Patent: Aug. 20, 2019

(54) METHOD AND APPARATUS FOR REHABILITATION OF WATER CONDUIT WITH LATERAL OPENINGS

(71) Applicants: Sanexen Environmental Services Inc., Brossard (CA); Niedner Inc., Coaticook (CA)

(72) Inventors: Sylvain Morissette, Sherbrooke (CA); Martin Bureau, Montréal (CA); Gilles Gagnon, Repentigny (CA)

(73) Assignees: Sanexen Environmental Services Inc., Brossard, Quebec (CA); Niedner Inc., Coaticook, Quebec (CA)

( * ) Notice: Subject to any disclaimer, the term of this patent is extended or adjusted under 35 U.S.C. 154(b) by 0 days.

(21) Appl. No.: 15/680,579

(22) Filed: Aug. 18, 2017

(65) Prior Publication Data

US 2019/0056054 A1    Feb. 21, 2019

(51) Int. Cl.
  *F16L 55/16*  (2006.01)
  *F16L 55/168*  (2006.01)
  *F16L 55/18*  (2006.01)

(52) U.S. Cl.
  CPC .......... *F16L 55/1683* (2013.01); *F16L 55/18* (2013.01)

(58) Field of Classification Search
  CPC ..... F16L 55/165; F16L 55/179; F16L 55/265; F16L 55/1652–1654
  USPC .............................. 138/97, 98; 156/293, 423
  See application file for complete search history.

(56) References Cited

U.S. PATENT DOCUMENTS

| | | | | |
|---|---|---|---|---|
| 4,893,389 A | * | 1/1990 | Allen | F16L 55/179 138/98 |
| 4,954,016 A | * | 9/1990 | Storgard | F16L 55/1656 138/97 |
| 5,167,258 A | * | 12/1992 | Rice | E03F 3/06 138/97 |
| 5,334,429 A | * | 8/1994 | Imoto | B29C 63/34 138/128 |
| 5,944,058 A | * | 8/1999 | Kamiyama | F16L 55/265 138/97 |
| 6,056,017 A | * | 5/2000 | Kamiyama | B29C 63/0086 138/97 |
| 6,103,052 A | * | 8/2000 | Kamiyama | B29C 59/007 138/97 |
| 6,641,688 B1 | | 11/2003 | Gearhart | |

(Continued)

FOREIGN PATENT DOCUMENTS

| | | |
|---|---|---|
| GB | 2503248 | 12/2013 |
| GB | 2541286 | 2/2017 |

(Continued)

OTHER PUBLICATIONS

Search Report for corresponding Great Britain Patent Application No. GB1813260.5 dated Jan. 28, 2019.

*Primary Examiner* — Patrick F Brinson
(74) *Attorney, Agent, or Firm* — Reed Smith LLP

(57) ABSTRACT

A method of rehabilitating a network of underground water conduits having at least one lateral opening and a membrane for that purpose is disclosed. The method comprising the steps of blocking and sealing the at least one lateral opening with a membrane impregnated with a hardening resin positioned over the at least one lateral opening, and allowing the resin to harden thereby forming a rigid membrane over the at least one lateral opening.

8 Claims, 5 Drawing Sheets

(56) References Cited

U.S. PATENT DOCUMENTS

| | | | | |
|---|---|---|---|---|
| 7,073,536 | B2 * | 7/2006 | Blackmore | B29C 63/0069 |
| | | | | 138/97 |
| 9,182,065 | B2 * | 11/2015 | Bichler | F16L 55/1654 |
| 2010/0078118 | A1 * | 4/2010 | Ehsani | B29C 63/28 |
| | | | | 156/94 |
| 2014/0311607 | A1 * | 10/2014 | Mathey | F16L 55/18 |
| | | | | 138/98 |
| 2015/0107713 | A1 * | 4/2015 | Manners | F16L 55/1654 |
| | | | | 138/97 |
| 2015/0362115 | A1 | 12/2015 | Arnold et al. | |

FOREIGN PATENT DOCUMENTS

| | | |
|---|---|---|
| GB | 2563628 | 12/2018 |
| KR | 101507821 | 3/2015 |

* cited by examiner

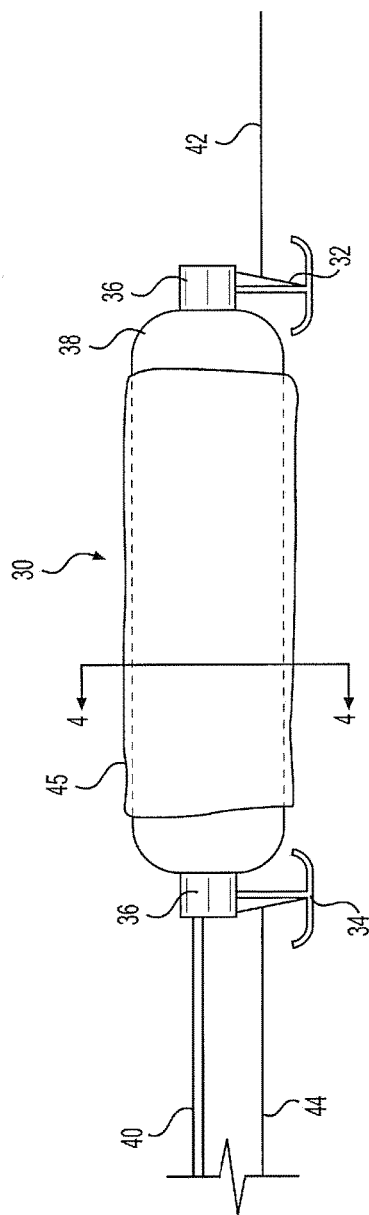
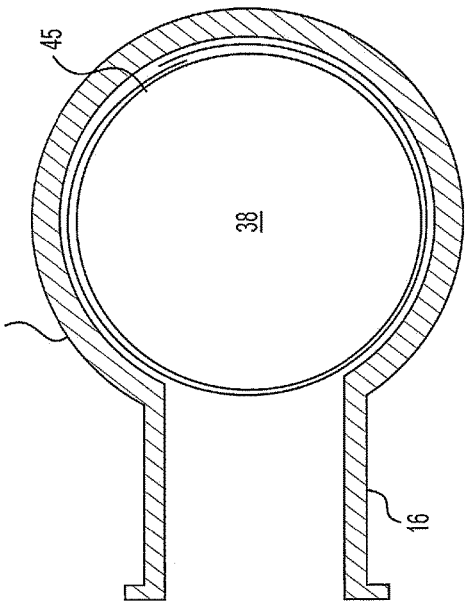
FIG. 3
FIG. 4
FIG. 5

METHOD AND APPARATUS FOR REHABILITATION OF WATER CONDUIT WITH LATERAL OPENINGS

FIELD OF THE INVENTION

The present invention relates to a method and apparatus for repairing and rehabilitating an underground conduit or pipe having one or more lateral openings.

BACKGROUND OF THE INVENTION

Underground water conduits, either potable water pipes, waste water pipes or sewer pipes, are typically made of rigid materials such as reinforced concrete, cast iron, ductile iron, steel and hard polymers such as PVC, HDPE, etc. that are durable and adapted to resist high internal pressure if required and the weight of the landfill covering them. Underground water pipes provide essential services to the urban population. A network of buried water pipes connected together extends over long distances, spreads out in all directions through lateral connections to provide services to residential home or businesses over a wide area.

One of the underlying problems with existing networks of pipes, especially potable water pipes, is that many were made and installed long ago and due to the old age of the pipes, as well as the materials used to make them, many pipes have begun to deteriorate, deform, or have damaged areas. The deformed or damaged areas create weak spots, which may allow water to leak out, roots, and dirt to infiltrate the pipes system and lead to the eventual collapse of the pipes which need to be repaired or replaced.

Replacing older networks of underground water conduits with new ones is unrealistic because of the sheer magnitude of the work that would be involved. However, repairing and rehabilitating existing water networks without the need to excavate represents a feasible alternative. Methods exist for repairing the walls of pipes and other conduits. One such method involves the use of a tubular liner impregnated with a cured-in-place resinous material, referred to as cured-in-place pipe (CIPP) which re-lines the inner walls of the conduit or pipe to repair the network of conduits or pipe. The liner is impregnated with a resin capable of curing and hardening to form a new inner wall for the aging or damaged pipes. The CIPP liner is placed in the pipe, and pressurized water is introduced inside the liner to press the liner against the pipe wall. The resin is allowed to cure and harden, thereby creating a new sealed interior pipe wall.

However, networks of underground pipes typically comprise main pipes and a series of lateral pipes connected to the main pipes via various types of connections such as T-connections, Y-connections or cross branch connections for example. When the tubular CIPP liner is installed into one of the pipes to be relined, the tubular liner ends up covering the lateral openings of the T-connections, Y-connections or cross branch connections. Once the resin of the tubular CIPP liner has cured and hardened, the lateral opening of the connections must be re-opened by cutting out the tubular CIPP liner blocking the lateral opening using a robot having a specifically designed cutting tool. In practice, when pressurized water is introduced and the tubular CIPP liner is pressed against the lateral opening of the connections, the liner expands inside the opening of the branches of the connections to form a blister and the resin seeps into the branches of the connections before it has time to cure thereby soiling the inner walls of the various branches of the connections. Once cured, the thus formed blister and hardened resin splattered inside the branches of the connections must be removed and this task is difficult and time consuming with a robot operating the cutting tool.

Therefore, there is a need for a method and apparatus for repairing and rehabilitating underground conduits or pipes having one or more lateral opening using a tubular CIPP liner which prevents blistering of the tubular CIPP liner inside a lateral branches of a connection and prevents uncured resin from seeping and splattering inside the lateral branches of the connection.

SUMMARY OF THE INVENTION

It is an object of the present invention to ameliorate at least some of the inconveniences present in the prior art.

In one aspect, the invention provides a method of rehabilitating a network of underground water conduits having at least one lateral opening, the method comprising the steps of blocking and sealing the at least one lateral opening with a membrane impregnated with a hardening resin positioned over the at least one lateral opening, and allowing the resin to harden thereby forming a rigid membrane over the at least one lateral opening. In an additional aspect, the rigid membrane is formed prior to the insertion of a tubular CIPP liner.

In an additional aspect, the invention provides that the membrane is installed onto an inflatable device, the inflatable device is brought into position in front of the at least one lateral opening and once in position, the inflatable device is inflated thereby expanding and pressing the membrane into contact with the inner wall of the water conduit around the at least one lateral opening.

In an additional aspect, the invention provides that the membrane consists of a cylindrical plug comprising a cylindrical C-shaped inner spring made of a preformed composite sheet and an outer layer consisting of a fabric sheet impregnated with a hardening resin. The cylindrical plug is brought into position in front of the at least one opening and once in position, the cylindrical C-shaped inner spring is released to expand and compress the membrane into contact with the inner wall of the water conduit around the at least one opening.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 3 is a schematic side elevational view illustrating a second embodiment of the invention in which an inflatable pipe plug mounted on fore and aft skates is used in combination with a membrane that surrounds the inflatable pipe plug;

FIG. 4 is schematic cross-sectional view taken at line 4-4 of FIG. 3 illustrating the membrane wrapped around the inflatable portion of the inflatable pipe plug;

FIG. 5 is a schematic cross-sectional view illustrating the membrane installed inside a T-connection in the expanded position through the force of the inflatable portion of the inflatable pipe plug;

DETAILED DESCRIPTION OF THE
PREFERRED EMBODIMENTS

The present invention and preferred embodiments is described with references to the opening of a lateral branch of a T-connection. However, the present invention and embodiments may be used to block and seal an opening of a lateral branch of a Y-connection or two lateral branches of a cross branch connection. The present invention and embodiments may also be used to block and seal a small localised breach opening in a network of water conduits.

Figure 1:
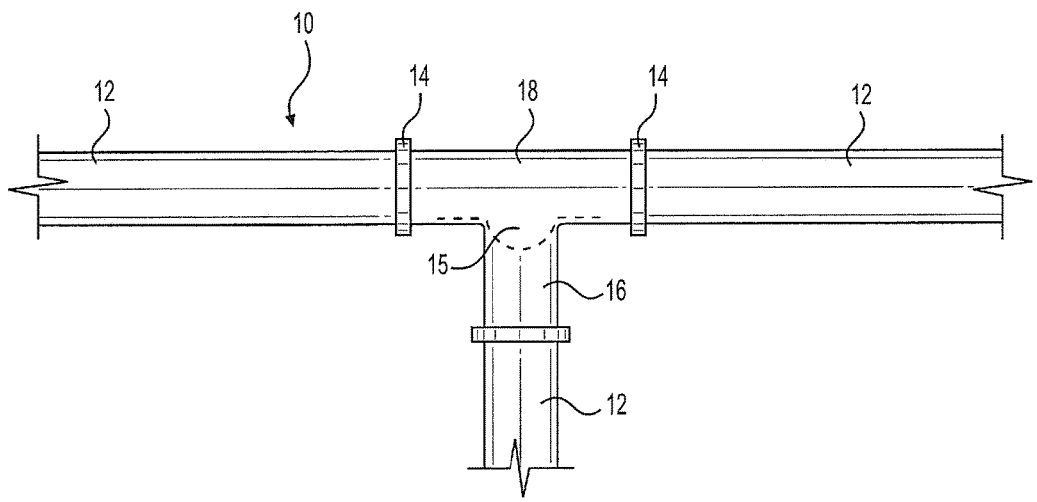
FIG. 1 is a schematic top plan view of a typical older network of underground water conduits.

FIG. 1 is a schematic illustration of a portion of a typical older underground water conduit 10 comprising straight segments of pipes 12 and a T-connection 18 joined together with couplings 14. Typical underground conduits for potable water have diameters ranging from 4 inches to 24 inches and the more common diameters range from 6 inches to 12 inches. Underground conduits for potable water have multiple small diameters service entrances ranging from ½ inch to 2 inches typically in diameter connected to residences or businesses supplying the end users with potable water.

As previously described, when the underground water conduits 10 is rehabilitated using a tubular CIPP liner, the tubular CIPP liner is pressurized against the lateral entrance of the T-connection 18 and expands inside the branch 16 of the T-connection to form a blister 15 as illustrated in dotted lines and the resin also seeps into the T-connection 18 before the resin has time to cure. Once cured, the thus formed blister 15 and the hardened resin splattered inside the T-connection must be removed with a robot operating a cutting tool. This task is difficult and time consuming.

Figure 2:
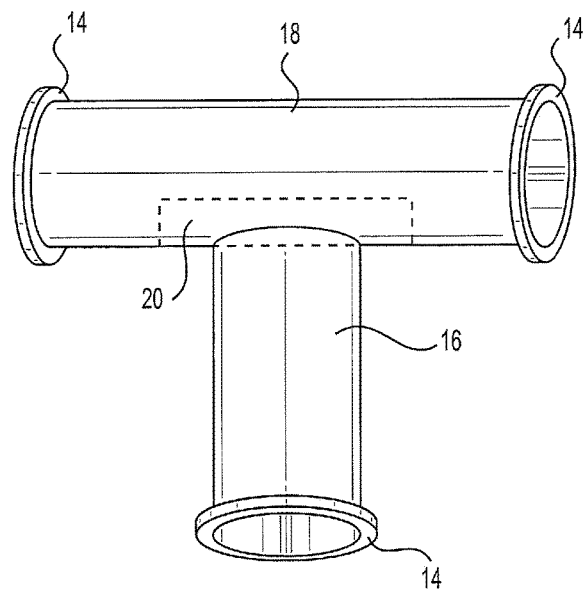
FIG. 2 is a schematic view of a T-connection comprising a membrane in accordance with a first embodiment of the invention blocking and sealing a lateral opening.

In order to circumvent this problem and avoid the difficult and time consuming operation of cutting out the blister 15 and removing the splattered resin inside the branch 16 of T-connection 18, the inventors have devised a method and apparatus to block and seal the opening of the branch 16 of T-connection 18 prior to the insertion of the tubular CIPP liner. As illustrated in FIG. 2, a membrane 20 impregnated with a hardening resin is positioned over the opening of the branch 16 of T-connection 18 and the resin is allowed to harden thereby forming a rigid membrane 20 prior to the insertion of the tubular CIPP liner such that the entrance of the branch 16 of T-connection 18 is blocked and sealed. The rigid membrane 20 preventing the formation of a blister 15 (FIG. 1) when pressure is applied inside the tubular CIPP liner during rehabilitation of the underground water conduits 10 and also preventing the resin of the tubular CIPP liner from seeping into the branch 16 of T-connection 18 and splattering the walls of the branch 16 of T-connection 18.

Membrane 20 comprises a woven sheath similar and preferably identical to the woven sheath of the tubular CIPP liner and is impregnated with a hardening resin which has similar or superior adhesive properties than the hardening resin of the tubular CIPP liner such as an epoxy based resin. Since the membrane 20 must adhere firmly to the walls of the T-connection 18 surrounding the entrance of the branch 16, the hardening resin must have strong adhesive properties. To that effect, the dimensions of the membrane 20 are preferably twice as wide and long as the diameter of the opening of the branch 16 it covers such that the membrane 20 covers the entire opening of the branch 16 and extends onto the wall of the T-connection 18 surrounding the opening of the branch 16 to provide sufficient contact surface with the wall of the T-connection 18 for proper adhesion and sufficient strength to resist the pressure when the tubular CIPP liner is pressurized against the membrane 20 during rehabilitation of the underground water conduits 10. For example, to block and seal a branch 16 having a diameter of 6 inches, the membrane 20 is preferably 12 inches by 12 inches or more.

In operation, the membrane 20 impregnated with its epoxy based resin is installed onto a robot comprising an inflatable surface. The membrane 20 is secured onto the inflatable surface of the robot. The robot carrying the membrane 20 is inserted into the underground water conduits 10 and crawls inside the underground water conduits 10 to bring the membrane 20 up to the T-connection 18 and into position facing the opening of the branch 16. The inflatable surface is then expanded with air pressure and the membrane 20 is pressed against the wall of the T-connection 18 surrounding the opening of the branch 16. Pressure is maintained onto the membrane 20 until the epoxy based resin has cured with or without application of heat. Once the resin has cured, membrane 20 is firmly adhering to the walls of the T-connection 18 and the portion of the membrane 20 directly over the opening of the branch 16 has become rigid. The inflatable surface is thereafter deflated and the robot crawls back the underground water conduits 10 and is removed.

Preferably, the inflatable surface of the robot comprises an anti-adhesive surface, such as silicone, to prevent the membrane 20 from sticking partially to it during curing of the epoxy based resin.

Once the robot is removed, the tubular CIPP liner is introduced into the underground water conduits 10 and laid over the walls of the segments of pipes 12 and of the T-connection 18 and therefore over the membrane 20 blocking and sealing the opening of the branch 16 of the T-connection 18. Once in place the tubular CIPP liner is pressed against the inner walls of the segments of pipes 12 and the T-connection 18 and the hardening resin is cured in place by the passage of hot pressurised water inside and through the tubular CIPP liner. Once the hardening resin of the tubular CIPP liner is cured, water pressure is removed and the tubular CIPP liner remains firmly against the inner walls of the segments of pipes 12 and of the T-connection 18 and over the membrane 20.

In effect, the rigid membrane 20 positioned over the opening of the branch 16 of the T-connection 18 has prevented the expansion of the tubular CIPP liner inside the branch 16 of the T-connection 18 and the formation of a blister 15 as illustrated in FIG. 1 and has also prevented the resin of the tubular liner from seeping into the branch 16 of the T-connection 18 during rehabilitation of the underground water conduits 10.

Thereafter, the branch 16 of the T-connection 18 must be re-opened using a robot operating a cutting tool. This task is now easy and quick as there is no blister 15 nor is there excess resin splattered on the walls of the branch 16 of the T-connection 18.

Oftentimes during the process of rehabilitating a network of underground water conduits, the T-connections are replaced altogether because they have been degraded beyond repair over the years and would not last very long even though a tubular CIPP liner is passed through them. In this case, in order to circumvent the same problem and avoid the difficult and time consuming operation of cutting out the blister 15 that will formed and removal of the splattered resin inside the lateral branches of the new T-connections, the lateral branch of the new T-connection is blocked and sealed using membrane 20 as previously described prior to installing the new T-connections in the network of underground water conduits. The operation of positioning the membrane 20 inside the new T-connection and curing its epoxy based resin is made much easier as access is simple and it can be done in a controlled environment as opposed to the operation previously described which requires carrying the membrane 20 inside the underground water conduits using a robot.

As previously mentioned, the membrane 20 impregnated with hardening resin is described for blocking and sealing the opening of a lateral branch of a T-connection. However, the membrane 20 may be used to block and seal an opening of a lateral branch of a Y-connection or two lateral branches of a cross branch connection. Membrane 20 may also be used to block and seal a small localised breach opening in a network of water conduits.

In a second embodiment of the invention, an inflatable pipe plug mounted on fore and aft skates is used in combination with a membrane that completely surrounds the inflatable pipe plug to blocked and sealed the opening of a lateral branch of a T-connections prior to rehabilitating a network of underground water conduits. As illustrated in FIG. 3, an inflatable pipe plug 30 manufactured by Logiball Inc. is modified by installing fore and aft skates 32 and 34 such that the inflatable pipe plug 30 is elevated and will not be in contact with the walls of the of pipes 12 or T-connection 18 when it is inserted in the network of pipes and moved into position. The inflatable pipe plug 30 includes a rigid tubular mandrel 36 and an inflatable rubber sleeve 38. The inflatable pipe plug 30 includes a pneumatic line 40 connected to a pneumatic pump (not shown) which will provide the required air pressure to inflate the rubber sleeve 38 at the appropriate time. A pair of cables 42 and 44 is attached to the fore and aft skates 32 and 34 to move the inflatable pipe plug 30 back and forth inside the network of pipes.

A membrane 45 impregnated with a hardening resin is wrapped around inflatable rubber sleeve 38 as shown in FIG. 4 such that the ends of the membrane 45 overlap. The membrane 45 is wrapped around inflatable rubber sleeve 38 when the latter is not inflated and the overlapping ensures that when the inflatable rubber sleeve 38 is inflated and expands, there is enough material for the membrane 45 to expand and cover most of the circumference of the T-connection 18 to be sealed as illustrated in FIG. 5. When wrapping the membrane 45 around inflatable rubber sleeve 38, the overlapping ends of the membrane 45 should be positioned opposite the opening of the branch 16 of the T-connection 18 to be blocked and sealed as illustrated in FIG. 5 to ensure that the strongest portion of the membrane 45 is in front of the branch 16 when the resin is cured.

In operation, membrane 45 is impregnated with hardening resin on site and thereafter wrapped around the deflated rubber sleeve 38 of the inflatable pipe plug 30. The assembly is then immediately inserted into an entrance of the network of underground water conduits carefully to avoid contact between membrane 45 impregnated with uncured resin and the walls of the pipe 12. The assembly is pulled with the cables 42 and 44 all the way to the center of the T-connection 18. The maneuvering and positioning of the assembly is performed with the help of a camera (not shown) as well known in the art.

Figure 6A:
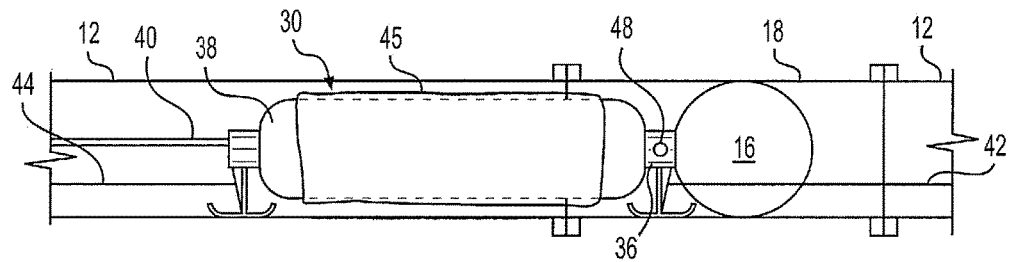
FIGS. 6a, 6b and 6c are schematic side elevational views of the inflatable pipe plug mounted on skates carrying the membrane inside a network of pipes into position inside a T-connection for blocking and sealing a lateral opening of the T-connection.
Figure 6B:
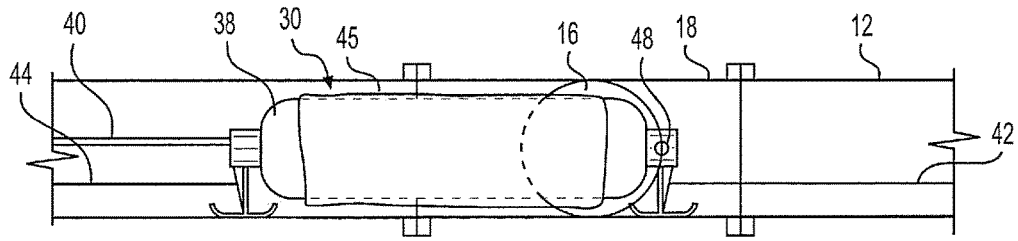
Figure 6C:
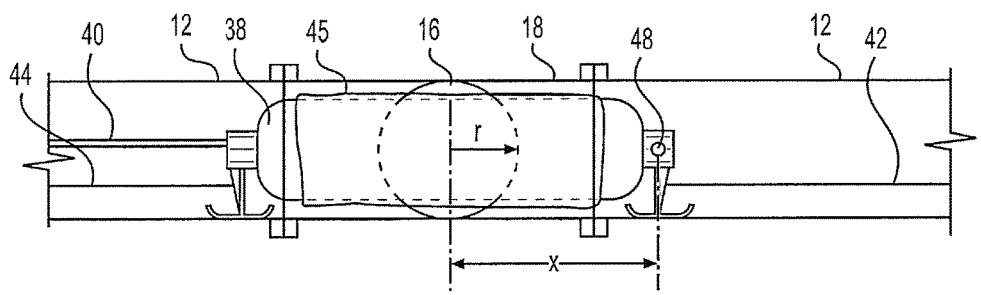

In a preferred embodiment, a laser 48 is installed in the front portion of the tubular mandrel 36 in order to precisely detect when the inflatable pipe plug 30 has reached the opening of the branch 16 of the T-connection 18. Laser 48 measures its distance to the wall of the pipe 12 and/or T-connection 18 which is relayed to a monitor positioned in front of the technician. When the laser 48 reaches the opening of the branch 16 as illustrated in FIG. 6a, the measured distance indicated on the monitor increases substantially indicating that the front of the inflatable pipe plug 30 has reached the opening of the branch 16 to be blocked and sealed. From that position, the inflatable pipe plug 30 is moved further up until the laser 48 reaches the end of the opening of the branch 16 as illustrated in FIG. 6b, where the measured distance indicated on the monitor decreases substantially indicating that the front of the inflatable pipe plug 30 has reached the end of the opening of the branch 16. The measured distance indicated on the monitor should be the same as prior to reaching the opening of the branch 16 since the laser 48 is measuring its distance to the wall of the T-connection 18. From that second position, the inflatable pipe plug 30 is moved a specific distance in order to center the inflatable rubber sleeve 38 and the membrane 45 on the opening of the branch 16 to be blocked and sealed as illustrated in FIG. 6c. The specific distance to move the inflatable pipe plug 30 from the second position to the centered position as shown in FIG. 6c is dependent upon the diameter or radius (r) of the opening of branch 16 and of course the length of the inflatable pipe plug 30 or more precisely, the distance (x) between the position of the laser 48 and the middle portion 51 of the inflatable pipe plug 30. The specific distance from the second position to the centered position as shown in FIG. 6c is therefore (x-r).

Once the inflatable pipe plug 30 is centered directly in front of the opening of branch 16 as shown in FIG. 6c, pressurized air is introduced into the inflatable rubber sleeve 38 of the inflatable pipe plug 30 through the pneumatic line 40 thereby inflating the rubber sleeve 38 and expanding the membrane 45 until the membrane 45 is firmly pressed against the wall of the T-connection 18 and blocks and seals opening of branch 16. The membrane 45 expands around inflatable rubber sleeve 38 as it inflates and the overlapping portions of the membrane 45 slide relative to each other as illustrated in FIGS. 4 and 5 to cover most or all the circumference of the T-connection 18.

Figure 7:
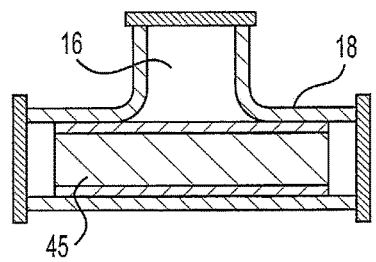
FIG. 7 is a schematic side elevational view illustrating the expanded membrane installed inside a T-connection.

Pressure is maintained on the expanded membrane 45 until the impregnated resin of the membrane 45 is cured (≈60 minutes). Once the resin is cured, the rubber sleeve 38 is deflated slowly to avoid undue stress on the cured membrane 45. Thereafter, the inflatable pipe plug 30 is removed from the pipe network. As illustrated in FIG. 7, the cured membrane 45 is left behind and blocks and seals the opening of the branch 16 of the T-connection 18.

A visual inspection of the cured membrane 45 with a camera is recommended to ensure that the membrane 45 has properly adhered to the walls and properly seals the opening of the branch 16 and that there are no surplus resin that may have seeped out along the edges of the membrane 45 and hardened in odd sharp shapes that may cause damage to the tubular CIPP liner as it is introduced into the underground water conduits. If there is sharp shaped hardened resin, it may be removed easily by revisiting the membrane 45 with a robot equipped with a cutting tool.

Once the above operation is completed, the tubular CIPP liner is introduced into the underground water conduits 10 and laid over the walls of the segments of pipes 12 and of the T-connection 18 and therefore over the cured membrane 45 blocking and sealing the entrance of the branch 16 of the T-connection 18. Once in place the tubular CIPP liner is pressed against the inner walls of the segments of pipes 12 and the T-connection 18 and the hardening resin is cured in place by the passage of hot pressurised water inside and through the tubular CIPP liner. Once the hardening resin of the tubular liner is cured, water pressure is removed and the tubular CIPP liner remains firmly against the inner walls of the segments of pipes 12 and of the T-connection 18 and over the cured membrane 45. The cured membrane 45 positioned over the entrance of the branch 16 of the T-connection 18 has prevented the expansion of the tubular CIPP liner inside the branch 16 of the T-connection 18 and the formation of a blister 15 as illustrated in FIG. 1 and has also prevented the resin of the tubular CIPP liner from seeping into the branch 16 of the T-connection 18 during rehabilitation of the underground water conduits 10.

Thereafter, the branch 16 of the T-connection 18 must be re-opened using a robot operating a cutting tool. This task is now easy and quick as there is no blister 15 nor is there excess resin splattered on the walls of the branch 16 of the T-connection 18.

As previously mentioned, the membrane 45 impregnated with hardening resin is described for blocking and sealing the opening of a lateral branch of a T-connection. However, the membrane 45 may be used to block and seal an opening of a lateral branch of a Y-connection or two lateral branches of a cross branch connection. Membrane 45 may also be used to block and seal a small localised breach opening in a network of water conduits.

Figure 8A:
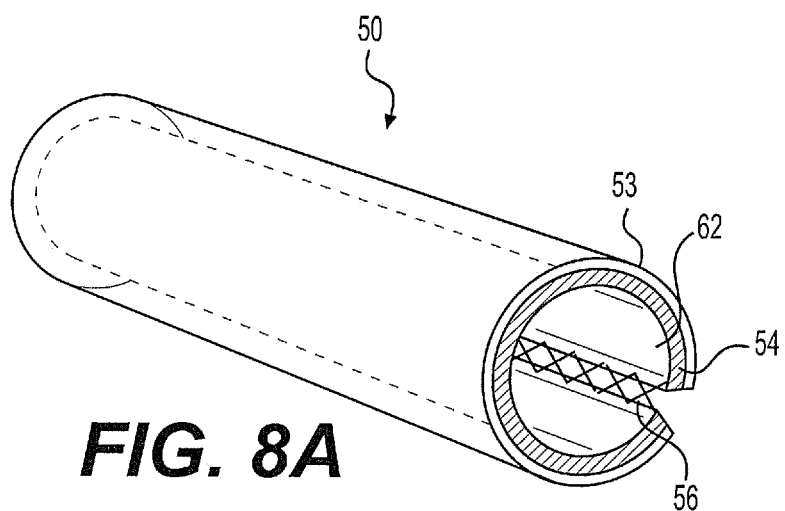
FIG. 8A is a schematic right side perspective view illustrating a third embodiment of the invention consisting of a spring-type cylindrical plug adapted for blocking and sealing a lateral opening.
Figure 8B:
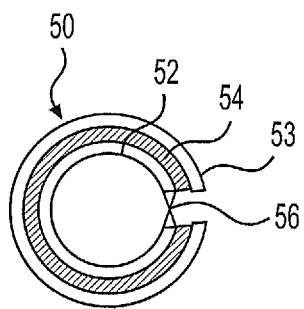
FIG. 8B is a schematic front elevational view of the spring-type cylindrical plug shown in FIG. 8A.

In a third embodiment of the invention, a spring-type cylindrical plug 50 is used for blocking and sealing the opening of the branch 16 of the T-connection 18. As illustrated in FIGS. 8A and 8B, the cylindrical plug 50 comprises a cylindrical C-shaped rigid inner spring 52 made of a preformed composite fiberglass sheet and an outer layer 53 consisting of a felt sheet impregnated with a hardening resin and a central layer 54 of hardening resin sandwiched between the cylindrical C-shaped rigid inner spring 52 and the outer felt sheet layer 53.

Figure 9:
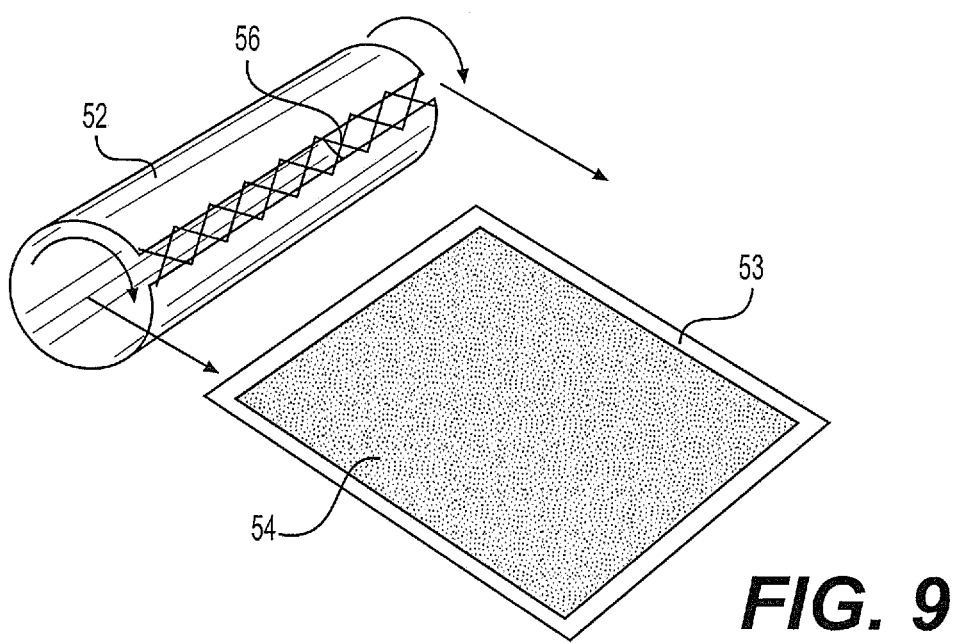
FIG. 9 is a schematic right side perspective view illustrating of the assembly of the spring-type cylindrical plug shown in FIG. 8A.

The cylindrical C-shaped rigid inner spring 52 is made by initially cutting a sheet of fiberglass to appropriate dimension, soaking and saturating the sheet of fiberglass with an epoxy resin in a vacuum bag. The soaked sheet of fiberglass is then inserted into a tubular mold of a diameter approximately 2 inches larger than the inner diameter of the T-connection 18 to be sealed and the epoxy resin is allowed to harden to form a rigid composite cylindrical sheet of fiberglass. Once hardened, a portion of the composite cylindrical sheet of fiberglass in the longitudinal direction is cut (arc of 20° to) 30° to form a C-shaped cylinder. In order to form a spring, the C-shaped composite cylinder is squeezed into a cylindrical template to reduce its diameter to about 1 inch smaller than the inner diameter of the T-connection 18 to be sealed and the two ends of the C-shaped composite cylinder are sown together with stitches 56 to retain the smaller diameter as illustrated in FIG. 9. The stitches 56 are preferably made with high strength wires such as Kevlar wires. The C-shaped composite spring 52 is now in tension and is ready to expand to a larger diameter when released.

The outer felt sheet layer 53 is made by cutting a felt sheet to appropriate dimension, soaking and saturating the felt sheet with a hardening resin in a flat configuration as illustrated in FIG. 9. A layer of viscous resin is then spread evenly onto the previous soaked felt sheet with a doctor blade to form the central layer 54. With the aid of a plastic sheet, the C-shaped composite inner spring 52 is then rolled onto the central layer of viscous resin 54 and the outer felt sheet layer 53 to form the spring-type cylindrical plug 50 illustrated in FIG. 8A. The spring-type cylindrical plug 50 is wrapped a plastic sheet and then frozen for storage and later used.

Figure 10A:
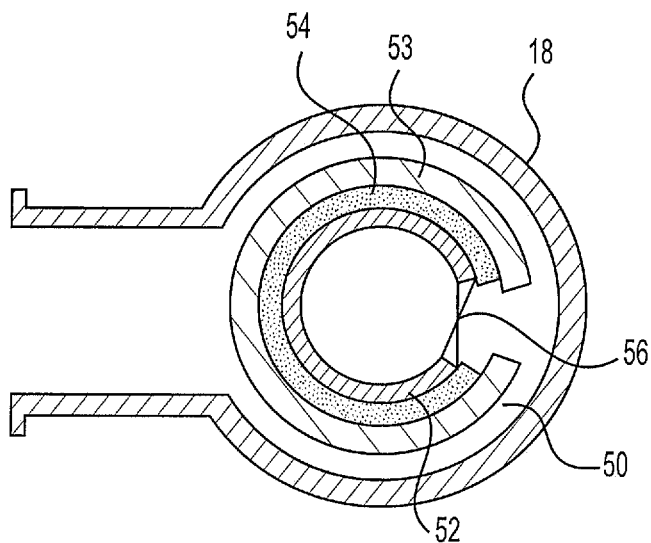
FIG. 10A is a cross-sectional view of the spring-type cylindrical plug in position in front of a lateral opening of a T-connection.
Figure 10B:
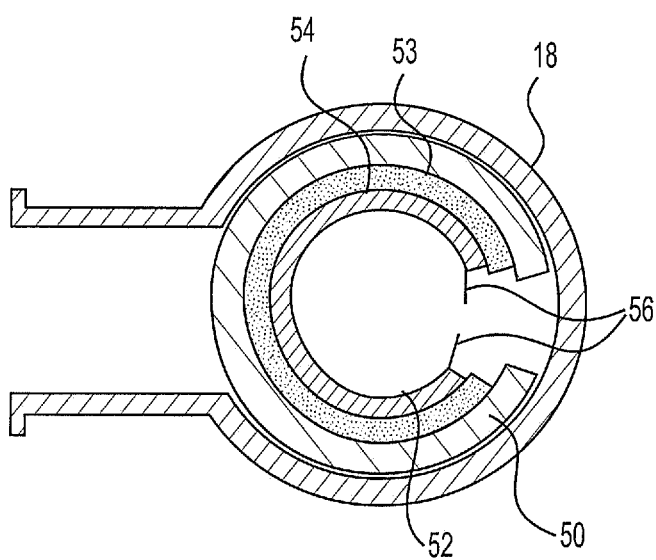
FIG. 10B is a cross-sectional view of the expanded spring-type cylindrical plug inside the T-connection.

In operation, the spring-type cylindrical plug 50 illustrated in FIG. 8A is brought to the rehabilitation site in a frozen state to prevent its curing. On site, the plastic sheet is removed. The spring-type cylindrical plug 50 is mounted onto a chariot with fore and aft skates and is brought into position centered with the opening of the branch 16 of the T-connection 18 as previously described. As illustrated in FIG. 10A, the spring-type cylindrical plug 50 under tension is centered with the opening of the branch 16 of the T-connection 18 with the stitches 56 positioned on the opposite side of the lateral branch 16 to be blocked and sealed to ensure that the strongest portion of the spring-type cylindrical plug 50 is in front of the opening of the lateral branch 16 when the resin is cured. The stitches 56 are then cut by any means thereby releasing the tension in the C-shaped composite inner spring 52 which expands and forces the outer layer 53 and central layer 54 against the wall of the T-connection 18 as shown in FIG. 10B thereby blocking and sealing the opening of the branch 16 of the T-connection 18. Depending on the type of resin, the process may require heat in order to cure the spring-type cylindrical plug 50 in place.

Once the above operation is completed, the tubular CIPP liner is introduced into the underground water conduits 10 and laid over the walls of the segments of pipes 12 and of the T-connection 18 and therefore over the cured cylindrical plug 50 blocking and sealing the opening of the branch 16 of the T-connection 18. Once in place the tubular CIPP liner is pressed against the inner walls of the segments of pipes 12 and the T-connection 18 and the hardening resin is cured in place by the passage of hot pressurised water inside and through the tubular CIPP liner. Once the hardening resin of the tubular liner is cured, water pressure is removed and the tubular CIPP liner remains firmly against the inner walls of the segments of pipes 12 and of the T-connection 18 and over the cured membrane 45. The cured cylindrical plug 50 positioned over the entrance of the branch 16 of the T-connection 18 has prevented the expansion of the tubular CIPP liner inside the branch 16 of the T-connection 18 and the formation of a blister 15 as illustrated in FIG. 1 and has also prevented the resin of the tubular CIPP liner from seeping into the branch 16 of the T-connection 18 during rehabilitation of the underground water conduits 10.

Thereafter, the branch 16 of the T-connection 18 must be re-opened using a robot operating a cutting tool. This task is now easy and quick as there is no blister 15 nor is there excess resin splattered on the walls of the branch 16 of the T-connection 18.

As previously mentioned, the cylindrical plug 50 impregnated with hardening resin is described for blocking and sealing the opening of a lateral branch of a T-connection. However, the cylindrical plug 50 may be used to block and seal an opening of a lateral branch of a Y-connection or two lateral branches of a cross branch connection. Cylindrical plug 50 may also be used to block and seal a small localised breach opening in a network of water conduits.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of rehabilitating a network of underground water conduits having at least one lateral opening, the method comprising the steps of blocking and sealing the at least one lateral opening with a membrane impregnated with a hardening resin positioned over the at least one lateral opening, wherein the membrane includes a cylindrical plug comprising a cyindrical C-shaped inner spring made of a preformed composite sheet and an outer layer consisting of a fabric sheet impregnated with a hardening resin, and allowing the resin to harden thereby forming a rigid membrane over the at least one lateral opening.

2. The method of claim 1 wherein the cylindrical C-shaped inner spring is maintained in a compressed state by sowing the two ends of the C-shaped inner spring together with stitches.

3. The method of claim 2 wherein the cylindrical plug is brought into position in front of the at least one lateral opening and once in position, the stitches holding the C-shaped inner spring are broken thereby releasing the C-shaped inner spring which expands and presses the cylindrical plug into contact with the inner wall of the water conduit around the at least one lateral opening.

4. The method of claim 1 wherein a laser is used to detect the exact position of the at least one lateral opening.

5. The method of claim 1 wherein the at least one lateral opening is the opening of a lateral branch of a T-connection, a lateral branch of a Y-connection, or a lateral branch of a cross connection.

6. The method of claim 1 wherein the at least one lateral opening is localized breach in the network of underground water conduits.

7. A membrane impregnated with a hardening resin adapted to block and seal a lateral opening inside a network of underground water conduits wherein the membrane includes a cylindrical plug comprising a cylindrical C shaped inner spring made of a preformed composite sheet and an outer layer consisting of a fabric sheet impregnated with a hardening resin.

8. The membrane of claim 7, wherein the cylindrical C-shaped rigid inner spring is maintained in a compressed state by sowing together the two ends of the C-shaped inner spring with stitches.

* * * * *